Feb. 3, 1925.
P. J. M. L. P. DE VIGNET DE VENDEUIL
1,524,786
EXPLOSION ENGINE
Filed April 30, 1923 2 Sheets-Sheet 1
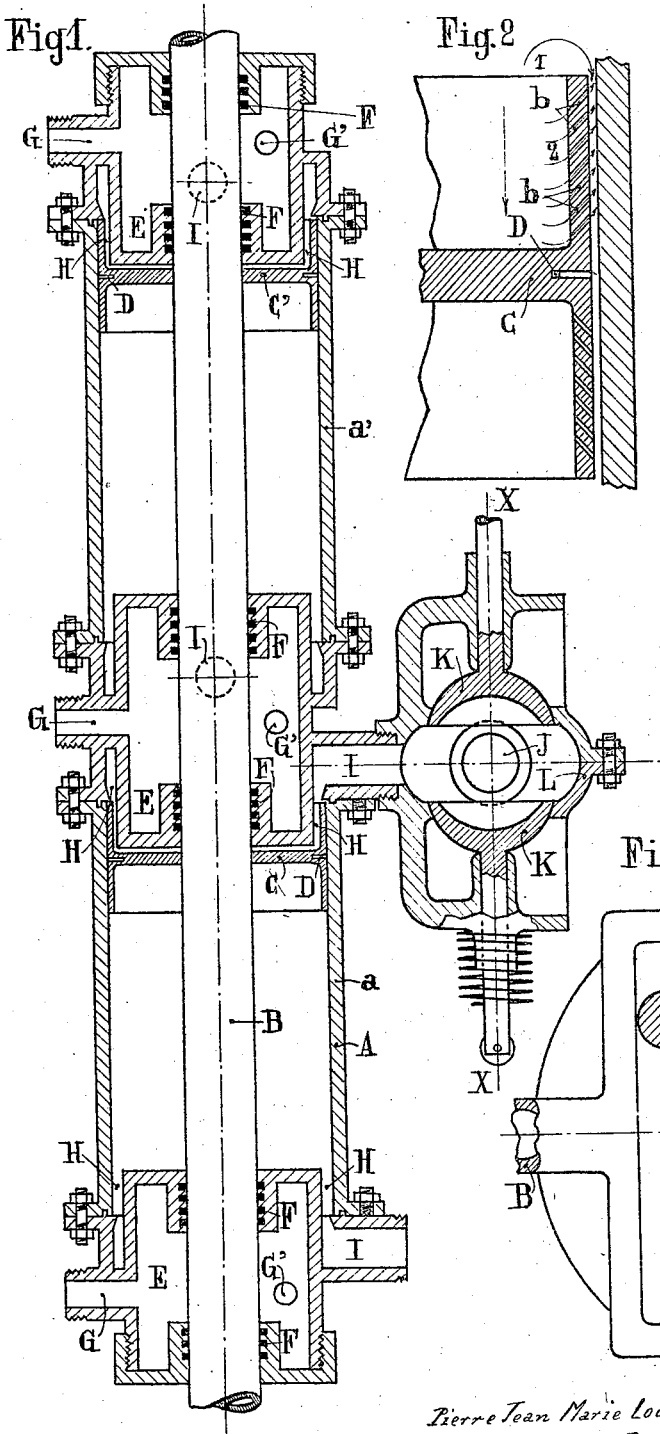
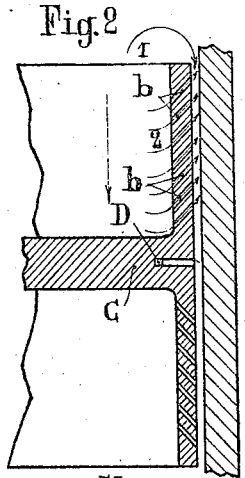
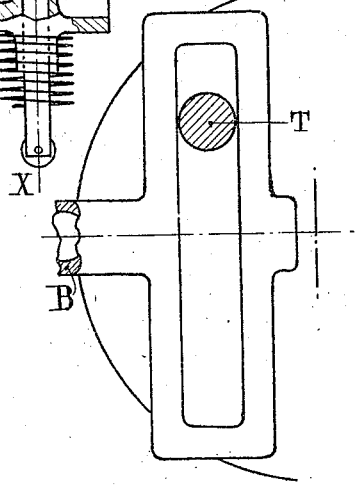
Inventor:
Pierre Jean Marie Louis Philibert de Vignet de Vendeuil
By
Attorney.

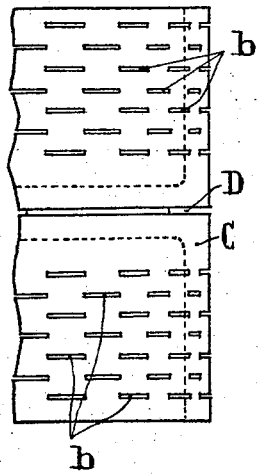
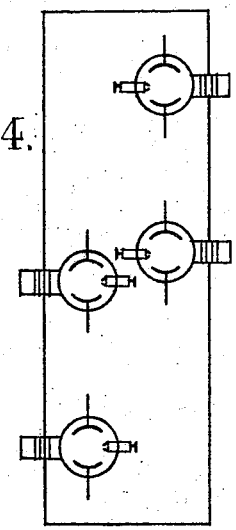
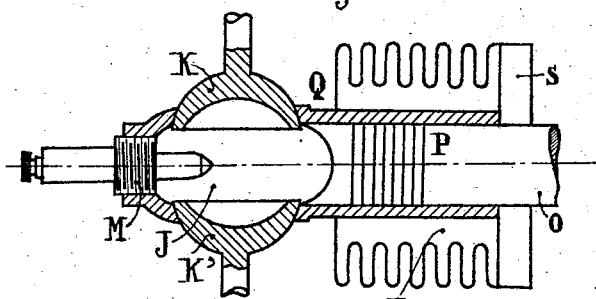
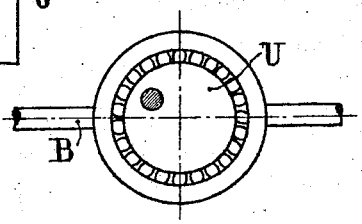
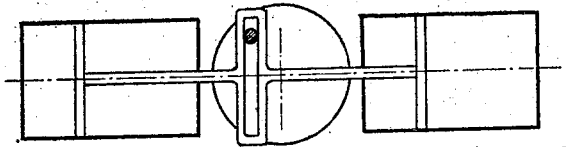

Patented Feb. 3, 1925.

1,524,786

UNITED STATES PATENT OFFICE.

PIERRE JEAN MARIE LOUIS PHILIBERT DE VIGNET DE VENDEUIL, OF MUSSIDAN, FRANCE.

EXPLOSION ENGINE.

Application filed April 30, 1923. Serial No. 635,739.

*To all whom it may concern:*

Be it known that I, PIERRE JEAN MARIE LOUIS PHILIBERT DE VIGNET DE VENDEUIL, citizen of the Republic of France, residing at Mussidan, France, have invented certain new and useful Improvements in Explosion Engines, of which the following is a specification.

The object of the present invention is to provide an improved double-acting explosive engine equipped, in effect, with a single cylinder and four driving pistons.

This engine is essentially characterized by: (a) two cylinders arranged end to end in line with one another so as to constitute a single cylinder. Within each of the said cylinders moves a piston reduced to the simplest form and working on both its faces, that is to say, double-acting. I thus group the action of four cylinders in a single cylinder. This arrangement ensures increased massic power, all parts being so coordinated as to minimize their number, weight, and bulk; (b) the fact that the usual steel rings of the pistons are replaced by gaseous rings; this feature enabling me to do away with piston lubrication and consequently with the cooling necessitated thereby, whence increased calorific efficiency; (c) the fact that, a driving stroke occurring on every piston travel within the cylinder, unsatisfactory balancing is done away with; (d) the fact that a special member, which I call a "multiplier" permits the power of the engine to be varied and the engine made to "spurt," as occurs with steam engines.

In order to make my invention more clearly understood, I have illustrated, as an example, an embodiment thereof in and by drawings appended hereto and wherein:

Figure 1 is a sectional view of the cylinder and of its various parts;

Figures 2 and 3 are detail views, respectively sectional and in elevation, showing the peculiar construction of the pistons;

Figure 4 is a diagram showing the arrangement of explosion chambers on the cylinder;

Figure 5 is a section on line X—X of Figure 1;

Figure 6 illustrates the transmission gear from shaft to crankshaft;

Figure 7 shows a modification of the cylinder arrangement;

Figure 8 illustrates a ball-bearing eccentric transmission gear.

The single cylinder A is formed of two cylinders $a$ and $a'$ arranged end to end. Axially of the said cylinder is located a hollow shaft B adapted to reciprocate endwise. Two pistons C and C' are rigidly secured to said shaft by any suitable means: welding, for instance. Piston C moves within cylinder $a$ and piston C' within cylinder $a'$.

The action of the explosions, which takes effect alternately on both faces of said pistons, reciprocates shaft B.

Said pistons are constructed very simply as shown by Figures 1, 2 and 3. They have no rings and do not rub against the walls of their respective cylinders, some clearance being allowed between said walls and piston sides. Therefore no piston lubrication is required.

Gas leakage through the space left between piston and cylinder is obviated by gaseous rings being formed due to a special arrangement of the piston walls producive of pressure balance.

Said walls are provided with fine slanting slots $b$ as shown by Figure 2, which are also imbricated or scalloped, that is to say, arranged checkerwise respecting one another as shown by Figure 3. Furthermore, each piston is provided with a circular groove D. Hence, if compression is exerted, for instance on the upper face of piston C, a pressure leakage as indicated by the arrow 1 tends to occur. But the countercurrents through slots $b$ indicated by arrows 2 oppose the said pressure leakage and the pressure becomes balanced on the two cylinder walls, forming gaseous rings. Should, nevertheless, a small pressure leakage take place, it would be taken up by cylinder groove D.

During its motion within cylinder A, shaft $b$ passes through oil tanks E ensuring shaft lubrication and cooling. Rings F make these tanks tight; oil entering at G', for instance, into tank E comes out at G and goes into a radiator to get cooled.

The walls of the said tanks constitute the ends of cylinders $a$ and $a'$ and form, due to their shape, annular compression chambers H, such annular shape being intended to cause "turbulence".

The ends of each of the cylinders $a$ and $a'$ communicate through openings I with explosion chambers J in which are located the following parts: intake and exhaust valves, spark plugs, and a special device which I call a "multiplier".

The explosion chamber being thus independent from the cylinder, the latter gets far less heated.

As will be apparent from the foregoing, I have four identical explosion chambers arranged as shown by Figure 4.

Said explosion chambers are spherical, so as to avoid heat losses as much as possible; the valves are therefore constituted by cups $k$ and $k'$. But in order to facilitate gas flow when one of the valves is lifted, spherical chamber J must have along its equator a groove L in the form of a torus segment..

Figure 5, which is a section of the explosion chamber along its equatorial plane X—X, shows the arrangement of the spark plug and of the multiplier within said chamber.

Spark plug M, which may be of any type, is provided with a lock nut N. I would preferably use the type of spark plug illustrated by Figure 5, it being fitted with two long porcelain cylinders in order to avoid short circuiting through clogging. Plug M discharges the spark in the very middle of the explosive mixture.

The "multiplier" is simply a small piston O, solid or hollow, provided with rings P and moving within a cylinder Q integral with chamber J and surrounded by a large cooling surfaced water jacket R.

Piston O passes through an oil tank S ensuring its lubrication. The head of said piston is hollowed in the form of a torus segment which serves as an extension of groove L of chamber J.

Piston O is driven from the engine through any suitable device, a cam, for instance, adapted to be adjusted at will by the operator according to the desired effect.

The working of the said multiplier is as follows:

At the beginning of the intake cycle, piston O is drawn by an operating member towards the outer part of chamber J; the volume of the intake chamber is therefore increased, the result being a larger admission of explosive gas. Immediately after the intake valve has closed and before piston C moves upwards (see Figure 1), piston O is driven towards chamber J, thereby compressing the mixture, thus decreasing the capacity of the compression chamber and consequently increasing compression therein.

Amplitude of the stroke of piston O can obviously be modified as desired by the operation of a suitable controlling device. Hence, the engine power can be varied at will, since, on the one hand, the volume of explosive gas admitted into the cylinder can be increased or decreased, and on the other hand, compression can be made stronger or weaker.

Reciprocation of shaft B rotates the crankshaft through any suitable device, for instance, a ball bearing eccentric U or a slotted cross-head, as shown by Figures 8 and 6. A crank-pin T drives the crank shaft.

Moreover, I am enabled to set up the engine with a cylinder A horizontally arranged, for in this case there is no danger of the cylinder wall becoming oval by wear.

Again, instead of adopting the arrangement shown by Figure 1, I may position the two cylinders $a$ and $a'$ as indicated in Figure 7, locating the crank shaft in between them. This method offers the advantage of even better balanced and greater compactness.

Furthermore, I can, by combining several groups of cylinders, build star-like engines similar in shape to aviation engines and yielding a very high specific power. As a matter of fact, this method has allowed engines to be built that weigh but 100 grams per HP. developed.

As regards bulk, an engine built according to my invention and equal in size to an ordinary motor cycle engine, will develop about 10 HP.

The above described engine having to undergo intense heat, advantage will accrue from building it of chrome nickle steel and giving it as small an expansion coefficient as possible.

Due to its compression being variable within wide limits, my engine is suitable for working with petrol, alcohol, petroleum, and even heavy oil; in the last case a very high compression must be had, and I therefore omit the carbureter and compress pure air into which I lead a jet of heavy oil, as with Diesel engines, the spark plug being, of course, then replaced by an incandescent coil which causes ignition.

With the above described engine I may even omit the spark plug and achieve self ignition by suitably arranging the work to be done by the auxiliary or multiplying piston O. All that is required for this purpose is that piston O, instead of compressing immediately after the inlet valve has closed, be made to wait until the main piston B has completed its compression stroke and then to compress until self ignition takes place.

Obviously, my engine might work like ordinary ones with steel ringed instead of gas ringed pistons, but then the piston would have to be lubricated by means of hollow shaft B and the cylinders to be cooled by means of water jackets.

I wish it to be clearly understood, that the hereinabove described type of engine has been given merely as an example of an embodiment of my invention, and that I reserve the right to modify constructional arrangements thereof without departing from the principle nor being deemed to exceed the scope of my invention.

Having now particularly described and ascertained the nature of my said invention as well as the manner in which the same is to be performed, I declare that what I claim is:

1. In an engine, the combination of a pair of cylinders arranged in axial alinement, each cylinder having annular spaces at its opposite ends forming compression chambers; a reciprocatory shaft extending axially through the cylinders and their said chambers; and a pair of double-acting pistons secured to said shaft within the respective cylinders for compressing the gaseous mixture in said chambers during their movements in opposite directions, said pistons having oppositely-directed cylindrical walls which are adapted to project into the compression chambers but are themselves spaced from both the outer and the inner walls of said chambers, said piston walls being provided with a multitude of fine slots to permit the compressed gaseous mixture to leak therethrough into the space between the piston walls and the outer walls of the chamber and thereby form gaseous rings; substantially as described.

2. An engine according to claim 1, in which the slots are disposed at a slant and in checkered relation.

3. In an engine, the combination of a pair of cylinders arranged in axial alinement; cylindrical oil tanks mounted in the cylinders and forming the ends thereof; a reciprocatory shaft extending axially through said cylinders and tanks and in direct contact with the oil in the tanks; and a pair of double-acting pistons secured to said shaft and working in the respective cylinders, said pistons adapted to compress the gaseous mixture against the adjacent walls of the tanks; substantially as described.

4. In an engine, the combination of a pair of cylinders arranged in axial alinement; cylindrical oil tanks mounted in the cylinders and forming the ends thereof, the side walls of the tanks being spaced from the cylinder walls; a reciprocatory shaft extending axially through said cylinders and tanks and in direct contact with the oil in the tanks; and a pair of double-acting pistons secured to said shaft within the respective cylinders for cooperation with the walls of the tanks, said pistons having oppositely-directed cylindrical walls which are adapted to project into the spaces between the cylinder and tank walls but which are themselves spaced throughout their entire extent from both said walls; substantially as described.

5. In an engine, the combination of a pair of cylinders arranged in axial alinement, a reciprocatory shaft extending axially through the cylinders, and a pair of double-acting pistons secured to said shaft within the respective cylinders; said pistons having their walls spaced from the walls of the cylinders and provided with means for enabling the compressed gaseous mixture to form gaseous rings in such spaces.

6. In an engine, the combination of a pair of cylinders arranged in axial alinement, a reciprocatory shaft extending axially through the cylinders, and a pair of double-acting pistons secured to said shaft within the respective cylinders; said pistons having their walls spaced from the walls of the cylinders and provided with a multitude of fine slots to permit the compressed gaseous mixture to leak therethrough into such spaces and form gaseous rings therein.

7. In an engine, the combination of a pair of cylinders arranged in axial alinement, a reciprocatory shaft extending axially through the cylinders, and a pair of double-acting pistons secured to said shaft within the respective cylinders; said pistons having their walls spaced from the walls of the cylinders and provided with a multitude of fine slots disposed at a slant and in checkered relation to permit the compressed gaseous mixture to leak therethrough into such spaces and form gaseous rings therein.

In testimony whereof I affix my signature.

PIERRE JEAN MARIE LOUIS PHILIBERT
de VIGNET de VENDEUIL.